Dec. 24, 1929.  J. S. HEBREW  1,740,458
R. R. REACTOR
Filed May 6, 1926
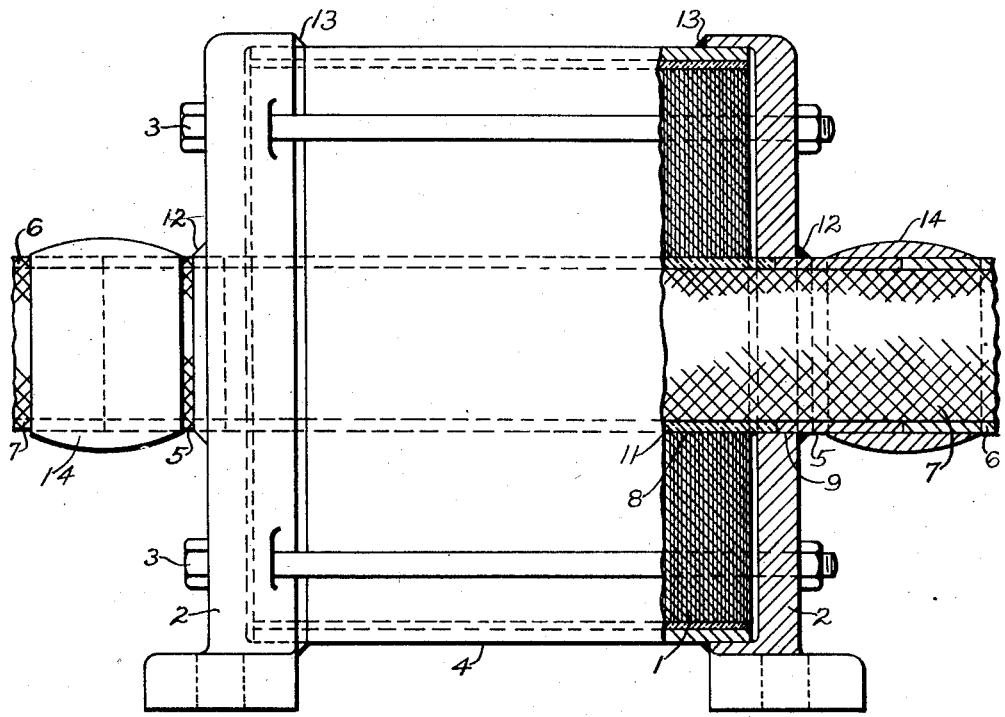
WITNESSES:
R. S. Williams
Lester J. Budlong
INVENTOR
Joseph S. Hebrew
BY
Wesley L. Carr
ATTORNEY Patented Dec. 24, 1929

1,740,458

UNITED STATES PATENT OFFICE

JOSEPH S. HEBREW, OF MASURY, OHIO, ASSIGNOR TO WESTINGHOUSE ELECTRIC & MANUFACTURING COMPANY, A CORPORATION OF PENNSYLVANIA

R. R. REACTOR

Application filed May 6, 1926. Serial No. 107,305.

My invention relates to electrical protective apparatus and particularly to current-limiting reactors.

One object of my invention is to provide a reactor that shall be adapted for use in connection with under-ground electrical networks.

A further object of my invention is to provide a reactor for use in connection with metal-covered cables under such conditions that the reactor shall be electrically enclosed within the metal covering for the cable.

In the operation of under-ground networks, it has heretofore been customary practice to pass lead-covered cables directly through the cores of reactors. However, since the covering of the cable at the ends of the reactor is at ground potential, and since the voltage drop in the current-conducting portions of the cable, caused by the action of the reactor, is reproduced in the lead cover of the cable, circulating currents have been generated which tended to neutralize the reactance of the reactor.

According to my invention, the metal covering is removed from that portion of the cable which is located within the reactor and the adjacent unremoved metal covering is electrically connected to the end frames of the reactor, that, in turn, are electrically connected externally of the core by a non-magnetic tubular member, whereby the ends of the metal covering of the cable are electrically connected across the reactor, and, also, the reactor and the exposed portion of the cable are kept dry.

The single figure of the accompanying drawing is an elevational view, partially in section, of a reactor embodying my invention.

My invention comprises, in general, a plurality of laminæ collectively constituting a magnetic core 1 that are confined between non-magnetic-metal end frames 2 by suitable bolts 3 that are surrounded by a non-magnetic metal tube 4, such as brass, connected to the end frames 2. Brass or other non-magnetic-metal tubes 5, to which the metal covering 6 of the cable 7 may be attached, are disposed centrally of the end frames 2.

The laminations of the core 1 are in the form of discs having central perforations, such that, when they are alined, the perforations provide an opening 8 that is alined with similar openings 9 in the end frames 2 whereby the electrical cable 7, when stripped of a portion of its metallic covering 6 may be threaded through the reactor. The metallic covering 6 is preferably of lead. A bushing 11 of suitable insulating material extends through the openings 8 and 9 in alinement with the tubular members 5.

The tubular members 5 are soldered, welded or brazed, as at 12, to the end frames 2, the latter, in turn, being soldered, welded or brazed, as at 13, to the tubular member 4, and the covering 6 of the cable 7 is soldered, as at 14, to the tubes 5, thereby enclosing the reactor and exposed portion of the cable in a water-proof housing. Since the tubular member 4 is of non-magnetic material, no currents are induced therein by reason of the magnetic excitation of the core 1.

When an electrical current traverses the cable 7, a certain voltage drop is induced therein by reason of the action of the core 1. Since the covering 6 of the cable 7 does not pass through the reactor, the voltage drop is not duplicated in it. Accordingly, because the lead sheath is, in effect, carried around the outside of the reactor, there are no deleterious circulating currents generated in the reactor by reason of the presence of a metal covering for the cable extending therethrough, and the reactance of the reactor is not neutralized thereby.

It will be understood, therefore, that I have devised a reactor for use in cooperation with metal-covered cables, wherein the cable covering is electrically extended to include the reactor and, at the same time, to provide water-proof joints between the cable covering and the reactor without necessitating the insertion of the metal covering for the cable through the reactor, with the resultant generation of undesired circulating currents.

It is to be understood that various changes may be effected without departing from the spirit and scope of the invention, as set forth in the appended claims.

I claim as my invention:

1. A reactor comprising a plurality of alined laminæ having openings therein for the reception of a cable, end frames for confining the laminæ, and a tubular member enclosing the laminæ between the end frames.

2. A reactor comprising a plurality of alined laminæ having openings therein for the reception of a cable, end frames for confining the laminæ, and a tubular member extending between the end frames and enclosing the laminæ.

3. A reactor comprising a plurality of alined laminæ having openings therein for the reception of a cable, end frames for the laminæ, and a tubular member extending between the end frames and enclosing the laminæ.

4. A reactor comprising a plurality of alined laminæ having openings therein for the reception of a cable, end frames for the laminæ and a tubular member of non-magnetic material extending between the end frames and enclosing the laminæ.

In testimony whereof, I have hereunto subscribed my name this 29th day of April, 1926.

JOSEPH S. HEBREW.